United States Patent [19]

Baird et al.

[11] Patent Number: 5,504,857
[45] Date of Patent: Apr. 2, 1996

[54] HIGHLY AVAILABLE FAULT TOLERANT RELOCATION OF STORAGE WITH ATOMICITY

[75] Inventors: Robert Baird, San Jose, Calif.; Gerald P. Bozman, Oakland, N.J.; George Eisenberger, White Plains, N.Y.; Albert Kamerman, Pound Ridge, N.Y.; Alexander S. Lett, Mahopac, N.Y.; John J. McAssey, Monroe, N.Y.; James J. Myers, San Francisco, Calif.; William H. Tetzlaff, Mount Kisco; Pong-sheng Wang, San Jose, Calif.

[73] Assignee: International Business Machines, Armonk, N.Y.

[21] Appl. No.: 26,278

[22] Filed: Mar. 4, 1993

Related U.S. Application Data

[63] Continuation of Ser. No. 535,083, Jun. 8, 1990, abandoned.

[51] Int. Cl.⁶ ................................................. G06F 11/00
[52] U.S. Cl. ................................................. 395/182.04
[58] Field of Search ........................... 395/575, 182.04; 364/200, 222.82, 266.5, 268.5, 268.9, 285.3; 371/10.1

[56] References Cited

U.S. PATENT DOCUMENTS

| | | | |
|---|---|---|---|
| 4,207,609 | 6/1980 | Luiz et al. | 364/200 |
| 4,438,494 | 3/1984 | Budde et al. | 364/200 |
| 4,459,658 | 7/1984 | Gabbe et al. | 364/200 |
| 4,503,534 | 3/1985 | Budde et al. | 364/200 |
| 4,608,688 | 8/1986 | Hansen et al. | 371/11.3 |
| 4,648,036 | 3/1987 | Gallant | 364/200 |
| 4,734,855 | 3/1988 | Banatre et al. | 395/425 |
| 4,750,106 | 6/1988 | Aiken, Jr. | 364/200 |
| 4,802,084 | 1/1989 | Ikegaya et al. | 395/400 |
| 4,814,975 | 3/1989 | Hirosawa | 395/375 |
| 4,945,474 | 7/1990 | Elliott et al. | 364/200 |
| 4,975,870 | 12/1990 | Knicely | 395/425 |
| 4,989,205 | 1/1991 | Dunphy, Jr. et al. | 371/10.1 |
| 5,043,866 | 8/1991 | Myre, Jr. et al. | 364/200 |
| 5,043,876 | 8/1991 | Terry | 364/200 |
| 5,088,026 | 2/1992 | Bozman et al. | 395/425 |
| 5,148,540 | 9/1992 | Beardsley | 395/575 |
| 5,175,839 | 12/1992 | Ikeda | 371/10.1 X |
| 5,201,044 | 4/1993 | Frey | 395/575 |

OTHER PUBLICATIONS

Bozman et al, "A Method for Managing a Data Cache Using Virtual External Storage Addresses as Argument".
D. J. Haderle et al, "Method for Managing Subpage Concurrency Control and Partial Transaction–Oriented System of the Write Ahead Logging Type".
Refer to copending patent application Ser. No. 07/493,581 IBM publication GC28–1150, "MVS/Extended Architecture System Programming Library: System Macros and Facilities". vol. 1.
Refer to Amdahl et al, U.S. Pat. No. 3,400,371, "Data Processing System", issued on Sep. 3, 1968, Ser. No. 357,372.

*Primary Examiner*—Robert W. Beausoliel, Jr.
*Assistant Examiner*—Glenn Snyder
*Attorney, Agent, or Firm*—R. Bruce Brodie

[57] ABSTRACT

A computer implemented method for robustly copying pages to system managed storage in order to maintain data in a consistent state and in order to provide continuous access availability of the pages to executing applications. The method achieves data consistency by atomically shadow copying application referenced pages and amending directories in a failure independent medium on (1) an access path interrupt as well as on (2) a page update basis. Availability is enhanced by duplexing the pages and directories as part of the atomic shadow copying step.

4 Claims, 3 Drawing Sheets

Object: Move RP3 on device 1 to device 2

(1) Find available RP on device 2 from SD (assume that RP201) is available and mark locked as assigned state.

(2) Copy RP3 to location of RP201

1. Establish a read only lock of RP3
    2. Execute copy operation by reading RP3 and writing it to RP201
    3. Atomically change the SD through shadow writing RP3 and RP201 so that:
       RP3 => now points to device 2 offset 2
       RP201 => now points to device 1 offset 3 and is returned to an available state.
    4. Release locks on RP3

*FIG. 3*

Storage Directory

| Logical Address | Device Offset | Duplex Address |
|---|---|---|
| RP100 | | |
| RP200 | | |
| RP3 | different device | RP250 |

Write/Read (1) Read logical file A
(2) Read VP2000
(3) obtain a read lock on RP3
(4) Lookup RP3 in SD (RP3 & RP250)
(5) Read device 1 at offset 3 * * *
    – suppose a fault occurs during the read operation on the primary copy –
(6) Read seconday copy at RP250 and initiate recover operations Recovery Objective: Make a new duplex copy of PR250 so as to reduce window within which a second fault could occur.

*FIG. 4*

HIGHLY AVAILABLE FAULT TOLERANT RELOCATION OF STORAGE WITH ATOMICITY

This application is a continuation of application Ser. No. 07/535,083, filed Jun. 8, 1990, abandoned.

FIELD OF THE INVENTION

This invention relates to CPU system managed storage (SMS), and more particularly, to methods and means for maintaining data in a consistent state in said SMS and for enhancing availability of said data to applications.

DESCRIPTION OF RELATED ART

In the prior art, when a CPU updated pages in its storage subsystem, it would either journal or duplex the updated pages. In the event of fault or interference in the completion of the update operation, the redundancy of journaled or duplexed pages would permit the CPU to roll the information state back to a prior point of consistency and permit a redo of the page update operation. However, the recovery actions required that the application currently executing on the CPU and reading or writing to storage would be suspended until completion of the rollback and recovery.

The following paragraphs describe aspects of the prior art believed pertinent to the invention. Reference is first made to the physical and virtual organization of storage. A brief discussion of trees as an accessing structure follows. Last, prior art use of shadow copying in storage recovery is summarized.

CPU and Some Operating Constituents

A CPU or processor typically includes a local operating system (OS), RAM oriented internal store, local instruction and data caches operatively formed from the internal store, an external store, and lock and cache resource managers.

Applications (processes/tasks) executing on a CPU generate read and write operations by way of the OS. In turn, the read and write operations utilize the data cache and lock resource managers to establish directory lockable access paths to data (pages, records, files) either resident in the data cache or as refreshed into the data cache from the external store.

Internal and External Storage

Many computer systems divide the physical storage subsystem into a number of performance levels. Some of these levels, such as DASD and tape, have been treated as shared access peripheral I/O devices and are accessed over an asynchronous path. Other levels, such as RAM and cache, have been treated directly by system hardware and accessed over a synchronous path as part of internal storage.

The term "internal storage" specifies that portion of storage randomly addressable for single read or write transfers. In IBM systems, internal storage is byte addressable except for an extension ("expanded store"). Expanded store is random accessed on a block or page addressable (4096 bytes/page) basis. It is managed as an LRU real memory backed paging store. Although the choice of unit of data size or frame is arbitrary. Lastly, "external storage" refers to that bulk portion of storage that is not randomly addressable and must be directly accessed as on DASD.

Demand Paging Virtual Storage

"Virtual Storage" is the addressing of a storage space usually much larger than that available in the internal storage of a CPU. It relies on locality of referencing in both space and time. That is, processes tend to reference storage in nonuniform highly localized patterns. This makes it possible for a small amount of real storage to back a much larger amount of virtual storage. If the referenced data is not available in internal storage, then it is swapped in from external storage.

In a virtual demand paging system, each process actively references some subset of its virtual pages. The capacity of the system to manage pages is measured in terms of an upper bound on the number of slots or "page frames". That is, the number of page frames is related to the amount of internal store set aside to support the page frames. If the sum of the subsets of pages referenced by processes exceeds the number of page frames, then faulting will occur. "Faulting" is a synonym for the requirement to access external storage since the referenced page was not resident in the LRU managed internal store. A system in this state is said to be "paging".

Bozman et al U.S. Pat. No. 5,088,026, filed Feb. 9, 1990, "A Method for Managing a Data Cache Using Virtual External Storage Addresses as Arguments", used two levels of address indirection to avoid both synonym problems and multiple copying of pages common to different logical views of pages in a data cache. In Bozman's method, pages are referenced according to their address in a linear space as mapped into a virtual external storage address (VESA) and then as mapped into a physical address in external storage. In this regard, the referenced pages are written into cache using their VESA addresses as indexing arguments. That is, the pages are written into a cache and indexed (ordered) by their VESA addresses. Then, multiple views can be formed by binding names (VESA addresses) thereto. This avoids having to duplicate copies of common pages and bind said copies to the views.

Trees and B-Trees Provide Access Paths To Virtual or Real Storage

A tree imposes a hierarchical order on a collection of items. The tree organization is frequently used to define page directories and to determine access rights and privileges. Structurally, a tree is a type of graph. That is, tree comprises a collection of nodes and acyclic connecting links in which one node termed a "root" is of in-degree 0 and a successor set consisting of all other nodes of in-degree 1, the term "in-degree" referring to the number of links inputting into a node.

To facilitate searching, the nodes of trees are ordered and oriented. The ordering (arbitrarily) may be from left to right such as by way of record key values or page ID's of increasing magnitude. Orientation arises from the existence of a path in a particular direction from any node to its successor node. The ordering and orienting permit recursive scanning of one successor or at most two immediate successors. Also, a tree is a data structure easily facilitating the retrieval, insertion, or deletion of pages located on external store.

A "leaf searchable" B-tree, is described in copending Bozman et al application U.S. Ser. No. 07/255,000, filed Oct. 7, 1988, "Method for Obtaining Access to Data Structures Without Locking". According to Bozman et al, a "leaf searchable" B-tree is one in which all record keys or page ID's and associated attributes appear in the external nodes (leaves) and the internal nodes contain separator keys (routers) which define a path to the leaves.

Shadow Copying and CPU Access to Storage Subject to Path Interference or Fault The term "shadow copying" refers to the practice that when an updated object is first written to external store, the system doesn't overwrite the original object, instead, the updated object is written elsewhere on external store and the counterpart directory is changed to point to the updated object. The old object is the "shadow" of the updated object.

Aiken, U.S. Pat. No. 4,750,106, "Disk Volume Data Storage and Recovery Method", issued Jun. 7, 1988, positions a dual or shadow copy of a DASD based tree organized index at a known offset from a first DASD copy in a relatively primitive storage management system. In such systems, index maps point to the DASD location of text streams and other objects. If the map is defective, then the objects cannot be accessed. Upon detection of "map" error, the shadow or backup copy can be invoked to aid location and recovery.

In log based transaction management systems, such described in copending D. J. Haderle et al, U.S. Ser. No. 07/059,666, filed: Jun. 8, 1987, "Method for Managing Subpage Concurrency Control and Partial Transaction Rollback in a Transaction-Oriented System of the Write Ahead Logging Type", interference with access to data usually requires suspending the application and rolling it back to a prior point of consistency using the event logs to repeat history of the transaction.

Gabbe et al, U.S. Pat. No. 4,459,658, "Technique for Enabling Operation of a Computer System with a Consistent State of a Linked List Data Structure After a Memory Failure", issued Jul. 10, 1984, describes and claims the use of a shadow copying of main memory contents in a chained manner periodically on a medium having an independent failure mode. Periodic updates include appending the changed contents thereto.

SUMMARY OF THE INVENTION

It is accordingly an object of this invention to devise a CPU implemented method and means for maintaining data in a consistent state in system managed storage (SMS) and for rendering said data continuously available to applications even though the CPU/applications access path to the data may be subject to interference or fault.

It is a related object to devise a method and means in which the copy/movement of data in a fault tolerant environment is executed as an atomic operation and concurrently with normal ops.

It is yet another object to devise a method and means in which reference to pages utilize VESA to facilitate multiple logical views of pages and avoid synonymy problems.

It is still another object of this invention to devise a method and means in which one or more units of DASD external storage may from time to time exhibit degraded performance (as an alternative to an outright failure), said method and means dynamically "off loading" a defective DASD without either terminating or interrupting normal storage operations.

According to the method of this invention, maintenance of data in a consistent state even in the presence of a single failure involves atomically shadow copying and amending directories onto a failure independent medium other than that used for the original page. The copying and amending is invoked for each referenced page either when the page is being updated or an interrupt occurs on an access path to a page i.e. read or write. In this regard, the access path to the pages preferably includes two levels of directory mapping (sometimes also called levels of indirection). Advantageously, two levels of logical mapping permit change of the application's logical view of pages without having to necessarily change the physical or absolute location of the pages in real storage. Conversely, changing the physical location of one or more pages would not invalidate the logical addresses expressed by applications running on the CPU.

More particularly, the method and means of this invention relate to maintaining consistency among pages or groups of related pages resident on failure independent devices of system managed storage and for enhancing page or page group availability to CPU executing applications. This is accomplished by (a) creating each new page at an absolute address on a first failure independent storage device and recording the path thereto as two levels of indirection in a directory, and (b) responsive to each page update or path interrupt, shadow copying the updated page to a second failure independent device and atomically updating the directory. The shadow copying and changes to the directory are performed atomically with the aid of low level locks. Furthermore, the shadow copying and use of a two level path directory effectuates random page distribution across the storage subsystem thereby reducing susceptibility to burst error over contiguous locations. Also, this method and means permits rerouting without having to recopy while atomicity ensures recovery to an unambiguous information state in the event of fault.

Advantageously, atomicity ensures recovery to an unambiguous information state in the event of fault. Also, shadow copying effectuates a random geometric page distribution across external storage thereby reducing susceptibility to errors running over contiguous page locations in absolute (real) storage.

Where the shadow copying and directory changes are DUPLEX RECORDED, then availability of said pages in SMS to executing applications even in the presence of at least single failure is enhanced.

Lastly, the use of directory access relying upon two levels of indirection (VESA/LOGICAL ADDRESS/ABSOLUTE ADDRESS) facilitates the specification of distinct views without multiple copies of the same real page being required even though the views have overlapping pages. This devolves from the fact that the views are defined by the (VESA, logical address1, logical address2 etc.) tuples.

BRIEF DESCRIPTION OF THE DRAWING

FIG. 3 sets forth a flow of control for moving an object from one DASD to another.

FIG. 4 illustrates a flow of control interrupted by fault and the invocation of recovery action including shadow copying the accessed object to another failure independent medium.

DESCRIPTION OF THE PREFERRED EMBODIMENT

The Host CPU Environment for Executing the Method of the Invention

The invention can be conveniently practiced in a configuration in which each CPU in the system is an IBM/360 or 370 architected CPU type having an IBM MVS operating system. An IBM/360 architected CPU is fully described in Amdahl et al, U.S. Pat. No. 3,400,371, "Data Processing System", issued on Sep. 3, 1968. A configuration involving CPU's sharing access to external storage is set forth in Luiz et al, U.S. Pat. No. 4,207,609, "Path Independent Device Reservation and Reconnection in a Multi-CPU and Shared Device Access System", filed May 8, 1978, issued Jun. 10, 1980.

An MVS operating system is also set out in IBM publication GC28-1150, "MVS/Extended Architecture System Programming Library: System Macros and Facilities", Volume 1. Details of standard MVS or other operating system services such as local lock management, sub-system invocation by interrupt or monitor, and the posting and waiting of tasks is omitted. These OS services are believed well appreciated by those skilled in the art.

Some Relations Among CPU's, Caches, and Storage

Figure 1:
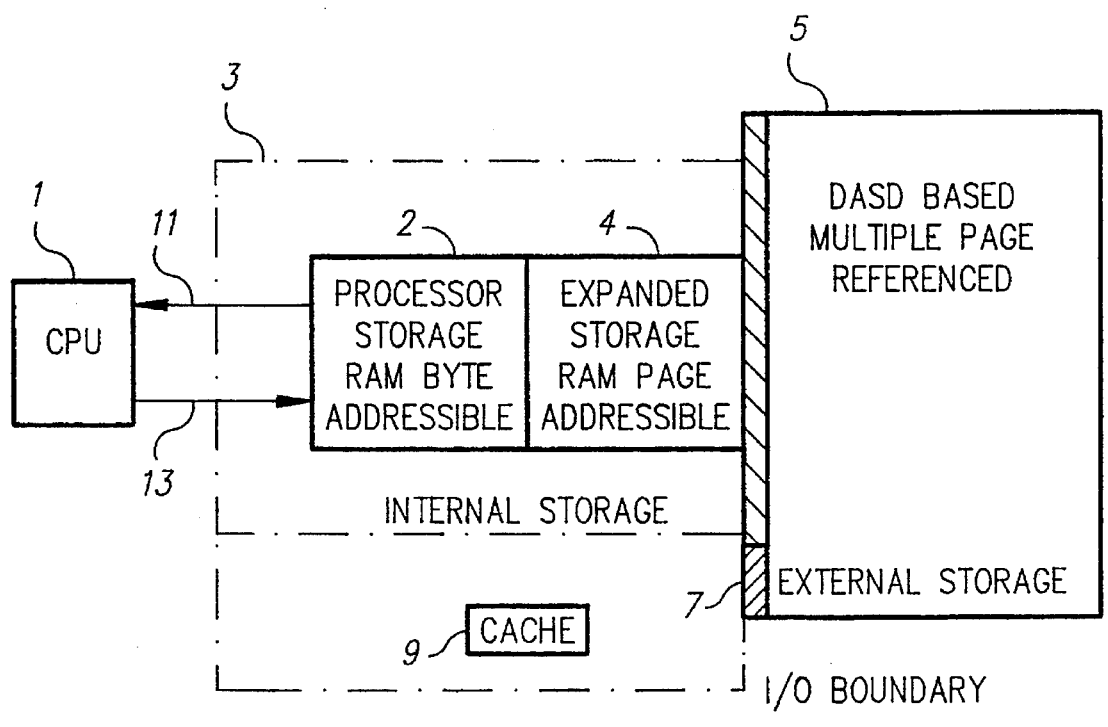
FIG. 1 sets out the organization of storage in relation to a large main frame CPU according to the prior art.

Referring now to FIG. 1, there is shown the relationship of organized storage to the CPU. As depicted, CPU 1 accesses both internal storage 3 and external storage 5 over paths 11 and 13. Internal storage 3 includes processor storage 2 and expanded storage 4. In this regard, processor store operates on a byte addressable random access while the expanded store operates on a page addressable random access basis. External storage 5 comprises one or more DASD and stores the file/record/page of the information referenced by applications executing on CPU 1.

Typically, an application invoking the CPU processor would reference a page by either its virtual/linear or real space address to a cache. In this regard, cache 9 could be hardware or software implemented. If software implemented, the cache could be located anywhere in internal storage 3. If the page is not available in cache 9, then either expanded storage 4 or external storage 5 needs to be accessed.

Where multiple pages are accessed across the I/O boundary 7 in external storage, they may be processed according to methods as set forth in the above-mentioned Luiz patent. Parenthetically, when a access is made to internal storage the processor waits until the access is completed. When access is made across the I/O boundary, the processor invokes another task or process while awaiting fetch (access) completion.

Storage Organization According to the Invention

In the method of this invention, it was decided to use indirect tables to track page location. Two levels of indirection permits relocation of pages by changing the tables without interference with applications referencing the pages. Preferably, when an application accesses a page or a group of related pages, a data cache in internal storage is first referenced. In this cache, pages are indexed and accessed according to their VESA addresses. In this regard, reference should again be made to the copending Bozman et al (SA9-89-093), U.S. Pat. No. 5,088,026, filed Feb. 9, 1990, "A Method for Managing Cache Using Virtual External Storage Addresses as Arguments".

The method of the invention further involves the shadow writing of a VESA referenced page or page group when that page or group is being updated or when an error or fault interrupt is detected. One modification involves the addition of duplexing each page in addition to shadow copying. In duplex operation, two copies of a page are stored in two frames on different disks. If either a page update or a failure occurs with reference to one of the two copies or versions, then the system can immediately make a copy of the good data in another location, update location tables, and resume operation. This ensures that the duration within which the system lacks two copies of the same page is minimized. However duplexing every page doubles the storage required.

Figure 2:
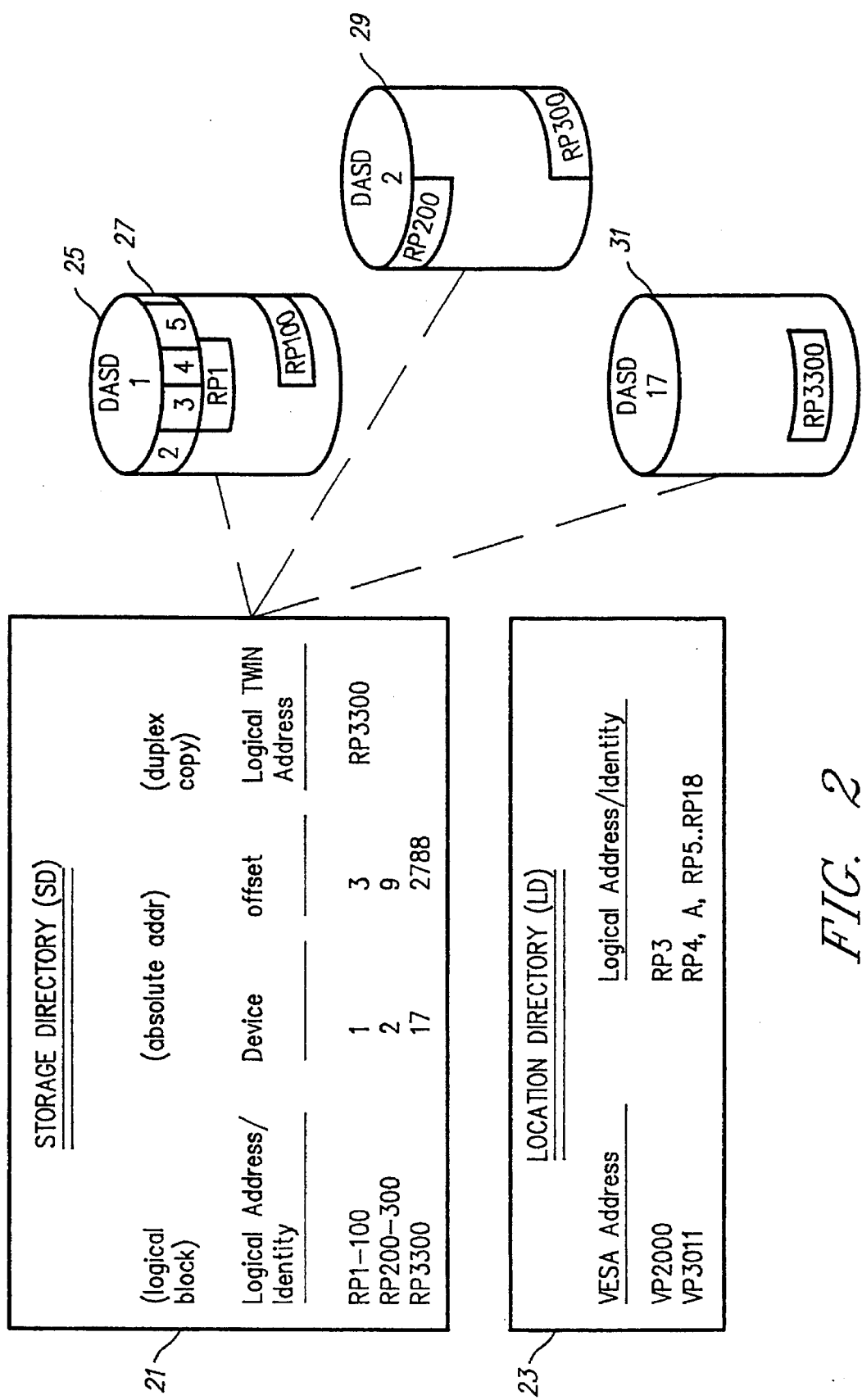
FIG. 2 depicts the concordances among logical and absolute addresses and VESA and logical addresses according to the method of the invention.

Referring now to FIG. 2, there is depicted a first (21) and a second (23) concordance of virtual and real page addresses in relation to a pair of DASD (25, 29) according to the method of the invention.

The first concordance 21 is denominated "Storage Directory" (SD). The SD matches a logical address of a page or a group of related pages to an absolute storage address. Also shown is the logical address of a duplex copy. Note, the duplex copy is NOT the shadow copy thereof.

The storing and accessing of a group of related pages, where the absolute address comprises an initial reference (device address)+displacement (Offset) reduces directory and concordance size. However, the SD could also be formed on a page level. This would require a logical address and an absolute address for each primary copy of a page and another logical and absolute address pair (tuple) for each shadow page.

The second concordance 23 is denominated "Location Directory" (LD). The LD matches a Virtual External Storage Address (VESA) to one or more logical addresses set out in the SD. Thus, any referencing of a page is made to that logical address paired with the page VESA. In the event of fault and the responsive shadow copying of the page and atomic updating of the directories and concordances, any rereferencing of the page by its VESA address will result in access to the page stored at the new logical and absolute address.

Illustratively, according to the SD, pages RP1 through RP100 reside in the external store starting at the absolute address of DASD 1 Offset 3. The shadow copy RP3300 of the pages RP1–RP100 is located on a failure independent medium at the absolute address of DASD 17 Offset 2788.

Operations

Referring now to FIG. 3, there is set out the control flow for moving a page from one failure independent medium to another. The "movement" is a copy operation using low level locking in order to effectuate an atomic change. That is, the copy operation and directory updating either succeeds or fails unambiguously, thereby avoiding ambiguity in the system state.

Referring now to FIG. 4, there is shown a flow of control of the method of the invention when interrupted by fault and the invocation of recovery action. Suppose, an application executing on CPU 1 references file A in the form of its VESA address VP2000. The location directory (LD) 23 entry in FIG. 2 shows that VP2000 consists only of logical page RP3. Referring back to FIG. 2, the SD entry for a logical page RP3 indicates that (1) it lies in the logical address interval RP1–100, (2) the absolute address of the RP1–100 interval is at DASD 1, offset 3, (3) the duplex copy of the internal is located at the logical address RP3300, and (4) the duplex copy of the RP1–100 internal including logical page RP3 resides at absolute address DASD 17, offset 2788.

Now further suppose, a fault occurs during a read operation of the primary copy. The response is to read the secondary copy of RP3 at the absolute address DASD 17, offset 2788 and reduplex the interval RP1–100 on another failure independent storage device so as to reduce the window within which a second fault could occur.

Atomicity in Write Operations to Enhance Availability Through Duplexing

As previously mentioned, operations are designated as being indivisible or atomic in that they are capable of only two states. These states consist of either operation completion or return to the pre-existing information state. Atomicity in the write operation is critical to the invention to secure both availability through duplexing and data integrity through shadow copying. The duplexing instances of interest include (a) writing of a single page in place, (b) writing of multiple pages in place by VESA address, and (c) relocation of pages within external storage.

(a) Atomic Writing of a Single Page in Place

When a page is written to DASD in place it overwrites the prior contents of the location. If there is a catastrophic failure during the operation, the old copy is obliterated without a new good copy being created. The duplex feature of the storage directory allows for writing VESA addressed pages in such a way that the operation will be atomic with respect to catastrophic outages. The following steps are taken:

(1) Writing the page in place to a primary copy.

(2) Waiting for successful completion. Should a failure occur before successful completion, the secondary duplex copy will still have the old contents of the page. The partially written page will be left in a condition that will make it unreadable. When the next read occurs the error will be detected and recovery will be done based on a secondary duplex copy.

(3) Writing the page in place to the secondary duplex copy.

(4) Waiting for successful completion. Should a failure occur before successful writing of the secondary copy then the primary copy has already been successfully written. Any later reads will use the new copy of the page. A consistency check should be run occasionally to detect primary/secondary miss matches that were caused by catastrophic failures.

If the primary is unreadable it should be corrected with a copy from the secondary copy thus rolling back to the initial state. If the secondary is unreadable it should be corrected with a copy from the primary thus completing the operation. If both are readable but they do not match then the operation should be completed by writing the contents of the primary onto the secondary.

(5) Signalling that the write is complete.

(b) Atomic Write or Copy of a Group of Related Pages in Place According to an Intermediate Logical Level of Addressing At times it is useful to write a group of pages accessed according to their intermediate logical level addresses such that either all or none will be written. The following steps demonstrate how the location directory (LD) can be used for this purpose.

(1) Obtaining new slots within external storage for all of the pages to be written by consulting the location directory.

(2) Writing all of the pages to their new locations. During this process the location directory has not been changed so a catastrophic failure will return the storage to its initial state.

(3) Atomically changing the location directory maps for the intermediate logical level addressed pages and the free space maps to make the new slots unavailable and the old slots available.

(4) Signaling that the operation is complete.

(c) Relocation of Data Within External Storage.

The objective is to be able to move data transparently to applications and to do it with integrity in the event of a catastrophic failure. The following scenario relocates external storage and comments on the effects of catastrophic failures at various points.

(1) Using the storage directory to find available external storage to be used as the target of the move operation.

(2) Initiating the process of copying the contents of storage slots from the source to the target. If a catastrophic failure occurs the old copy will continue to be used because the storage directory has not been updated yet. During this copy operation read operations from the client can be honored from the existing copy. Write operations should be temporarily deferred until the copy completes.

(3) Atomically updating the storage directory to activate the new copy, return the old copy storage to available status, and make the new copy storage unavailable for allocation.

(4) Continuing deferred write operations against the new copy.

These and other extensions of the invention may be made without departing from the spirit and scope thereof as recited in the appended claims.

We claim:

1. A CPU implemented method for maintaining consistency among pages or groups of related pages resident on failure independent devices of system managed storage (SMS) and for enhancing page or page group availability to CPU executing applications, said CPU having directory lockable access paths to the pages resident on SMS devices subject to interference or fault, executing applications causing page read and write accesses to be made through the operating system to SMS, said SMS including randomly accessed internal storage and directly accessed external storage, pages or groups of pages being accessible by way of a first logical address space mappable into a second logical address space, and lastly mappable from the second logical address space into an absolute location on a failure independent device, wherein the improvement comprises:

(a) responsive to each write access to a first logical address creating a page or group of pages, the step of generating and recording a pair of address tuples indicative of the location of said created pages or group of pages in said first and second logical address and absolute address spaces in a first directory, each address tuple correlating a second logical with an absolute address and a first logical with a second logical address for each page or group of pages, said first directory being referenced to establish access paths to the pages, and writing said page or group at the absolute address of a device in SMS; and (b) responsive to a write update access to the first logical space address of an SMS stored page or group of pages, or, responsive to an interrupt in the access path, the step of shadow writing the page or group onto another device and atomically generating and recording another pair of address tuples (address in the second logical space, absolute address; address in the first logical space, address in the second logical space) in said first directory.

2. The method according to claim 1, wherein the step responsive to a write update access or to an interrupt in the access path further includes the step of executing a step selected from the set consisting of (a) writing of a single page in place, (b) writing of a group of related pages in place by their address in the second logical space, and (c) relocation of pages within external storage.

3. A method for robustly copying of pages within a CPU storage subsystem having failure independent storage media substituents thereof, said copying ensuring subsystem availability of pages accessed by an executing application, wherein the improvement comprises:

(a) responsive to each write operation creating a page or group of related pages addressable in a first logical address space, the steps of defining a first concordance of a address for the page or group in a second logical address space, and an address in the storage subsystem for said page or group in an absolute address space, defining a second concordance of said first logical address and counterpart second logical address for the page or group, and writing the page at the absolute address on a first failure independent device in the storage subsystem; and (b) responsive either to each write update or to each interrupt in establishing an access path to a page or group in the storage subsystem addressable by a counterpart address in the first logical address space, the steps of copying the page or group having said counterpart address in said first logical address space from its current addresses in the second logical address and absolute address spaces to another failure independent device in the storage subsystem at new addresses in the second logical and absolute address spaces, and, atomically updating the concordances such that the new address of the page or group in the second logical address space is paired with the new address in the absolute address space, and the address of the page or group in the first logical address space is paired with the new address in the second logical address space.

4. In a system having a processor having an internal memory, an operating system, a data cache formed from processor internal memory, an external store coupling said data cache and including failure independent storage devices, and means responsive to application generated read and write ops issued via the operating system for accessing a page or group of related pages either resident in the cache or as refreshed into cache from the external store, said means for accessing a page or group of related pages utilizing directory lockable paths to a page or group, the path for each page or group including an address in a first logical address space mapped to an address in a second logical address space, and where the address in the second logical address space is mapped to an absolute storage subsystem location (device, offset) on a first storage device, said processor having means including the operating system for providing interrupt indication of access path fault, interference or degraded performance;

wherein the improvement comprises:

means for dynamically defining and updating page or group location directories for the external store as absolute addresses indexed by addresses in the second logical address space and as addresses in the second logical address space indexed by addresses in the first logical address space;

means responsive to each interrupt or page update or group update accessed by an address in the first logical address space for shadow copying the addressed page or group on a second storage device at a new address in the second logical address space and a new absolute address; and means for atomically changing the directories including the entries in which the new absolute address is indexed by the new address in the second logical address space and the new address in the second logical address space is indexed by a counterpart address in the first logical address space.

* * * * *